US012560749B2

(12) United States Patent     (10) Patent No.:   US 12,560,749 B2

Houck     (45) Date of Patent:    Feb. 24, 2026

(54) COMMUNAL OPTICAL FILTER AND OTHER OPTICAL FILTERS ON SUBSTRATE

(71) Applicant: VIAVI Solutions Inc., San Jose, CA (US)

(72) Inventor: William D. Houck, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 874 days.

(21) Appl. No.: 16/948,932

(22) Filed: Oct. 6, 2020

(65) Prior Publication Data

US 2022/0107449 A1     Apr. 7, 2022

(51) Int. Cl.
| | |
|---|---|
| *G02B 5/20* | (2006.01) |
| *G02B 5/02* | (2006.01) |
| *G01J 3/00* | (2006.01) |
| *G01N 21/00* | (2006.01) |

(52) U.S. Cl.
CPC ........... *G02B 5/201* (2013.01); *G02B 5/0278* (2013.01); *G01J 3/00* (2013.01); *G01N 21/00* (2013.01)

(58) Field of Classification Search
CPC ....... G02B 5/0278; G02B 5/201; G02B 5/285
See application file for complete search history.

(56) References Cited

U.S. PATENT DOCUMENTS

| | | | | |
|---|---|---|---|---|
| 5,072,109 A | | 12/1991 | Aguilera, Jr. et al. | |
| 5,164,858 A | * | 11/1992 | Aguilera, Jr. ............. | G01J 3/51 |
| | | | | 359/590 |

| | | | | |
|---|---|---|---|---|
| 6,068,953 A | * | 5/2000 | Matsumoto ....... | G02F 1/133516 |
| | | | | 430/7 |
| 6,613,486 B1 | * | 9/2003 | Ohtsu .................... | G02B 5/201 |
| | | | | 430/7 |
| 7,502,058 B2 | * | 3/2009 | Hiatt ................. | H01L 27/14685 |
| | | | | 348/294 |
| 8,461,659 B2 | * | 6/2013 | Kokubun ............... | G02B 5/285 |
| | | | | 438/70 |
| 10,082,611 B2 | * | 9/2018 | Shiono .................. | C09B 57/007 |
| 11,257,997 B2 | * | 2/2022 | Lin ........................ | H01L 27/156 |

(Continued)

FOREIGN PATENT DOCUMENTS

| | | | |
|---|---|---|---|
| DE | 202007019582 U1 | 1/2014 | |
| EP | 2222077 A2 | 8/2010 | |
| JP | S59200221 A | 11/1984 | |

OTHER PUBLICATIONS

Gerver et al., "Programmable microfluidic synthesis of spectrally encoded microspheres," Lab Chip, 2012, 12, pp. 4716-4723.

(Continued)

*Primary Examiner* — Bao-Luan Q Le

(74) *Attorney, Agent, or Firm* — Harrity & Harrity, LLP

(57) ABSTRACT

A composite optical filter may include a substrate, a communal optical filter, one or more first optical filters, and one or more second optical filters. The communal optical filter may be formed on a first surface of the substrate. The one or more first optical filters may be formed on one or more first portions of a second surface of the substrate and may be configured to pass light associated with a first wavelength. The one or more second optical filters may be formed on one or more second portions of the second surface of the substrate and may be configured to pass light associated with a second wavelength.

20 Claims, 4 Drawing Sheets

(56) References Cited

U.S. PATENT DOCUMENTS

| | | | | |
|---|---|---|---|---|
| 11,721,794 B2* | 8/2023 | Lin | ............... | H01L 33/62 |
| | | | | 257/89 |
| 2001/0031405 A1* | 10/2001 | Phillips | ............... | G02B 5/223 |
| | | | | 430/7 |
| 2005/0153356 A1* | 7/2005 | Okawa | ............... | G01N 21/6452 |
| | | | | 382/128 |
| 2008/0159658 A1* | 7/2008 | Yun | ............... | H01L 27/14621 |
| | | | | 427/164 |
| 2009/0321864 A1* | 12/2009 | Kang | ............... | H01L 27/14685 |
| | | | | 257/E31.127 |
| 2009/0321865 A1 | 12/2009 | Kasano et al. | | |
| 2010/0214454 A1* | 8/2010 | Kikuchi | ............... | H04N 25/702 |
| | | | | 348/308 |
| 2011/0074960 A1* | 3/2011 | Nagata | ............... | H01L 27/1464 |
| | | | | 348/E5.09 |
| 2011/0108705 A1* | 5/2011 | Izuha | ............... | H01L 27/14685 |
| | | | | 257/E31.127 |
| 2012/0001285 A1* | 1/2012 | Kokubun | ............... | H10F 39/024 |
| | | | | 257/E31.127 |
| 2014/0091419 A1* | 4/2014 | Hasegawa | ............... | G02B 13/005 |
| | | | | 359/359 |
| 2016/0216558 A1* | 7/2016 | Toki | ............... | G02B 5/223 |
| 2016/0266436 A1* | 9/2016 | Jiao | ............... | H10K 50/828 |
| 2017/0355637 A1* | 12/2017 | Nomura | ............... | C03C 4/085 |
| 2018/0180486 A1* | 6/2018 | Pau | ............... | H04N 5/33 |
| 2018/0315788 A1* | 11/2018 | Kuo | ............... | H01L 27/14605 |
| 2019/0109161 A1* | 4/2019 | Goto | ............... | G02B 5/3016 |
| 2019/0319058 A1* | 10/2019 | Imoto | ............... | H01L 27/1464 |
| 2019/0393273 A1* | 12/2019 | Umezu | ............... | H05B 33/14 |
| 2021/0202809 A1* | 7/2021 | Lin | ............... | H01L 33/60 |
| 2021/0255543 A1* | 8/2021 | Williams | ............... | G03F 7/0002 |
| 2022/0085081 A1* | 3/2022 | Yokochi | ............... | H10F 39/805 |
| 2022/0173290 A1* | 6/2022 | Lin | ............... | H10K 59/878 |

OTHER PUBLICATIONS

"The Multivariate Optical Element Platform," Technology Overview, CIRTEMO, 2013, Website: www.cirtemo.com, 14 Pages.
Extended European Search Report for Application No. EP21200099.6, mailed on Feb. 21, 2022, 10 pages.

* cited by examiner

Optical Filters 170 for Fourth Wavelength

Optical Filters 160 for Third Wavelength

Optical Filters 150 for Second Wavelength

Array of Optical Filters 130

Optical Filters 140 for First Wavelength

200

COMMUNAL OPTICAL FILTER AND OTHER OPTICAL FILTERS ON SUBSTRATE

BACKGROUND

An optical filter is a device that selectively transmits, reflects, and/or absorbs light, incident on the optical filter, based on wavelength. An optical filter may be used to pass or transmit certain wavelengths of light to a device, such as an optical sensor, an image sensor, and/or the like.

SUMMARY

In some implementations, a composite optical filter includes a substrate; a communal optical filter formed on a first surface of the substrate; one or more first optical filters formed on one or more first portions of a second surface of the substrate, wherein the one or more first optical filters are configured to pass light associated with a first wavelength; and one or more second optical filters formed on one or more second portions of the second surface of the substrate, wherein the one or more second optical filters are configured to pass light associated with a second wavelength.

In some implementations, an optical device includes an image sensor, and a composite optical filter, wherein the composite optical filter comprises: a substrate; a communal optical filter formed on a first surface of the substrate; and an array of optical filters formed on a second surface of the substrate, wherein a first set of optical filters, of the array of optical filters, is configured to pass light associated with a first wavelength, and wherein a second set of optical filters, of the array of optical filters, is configured to pass light associated with a second wavelength.

In some implementations, an optical system includes a light source; an optical filter; an image sensor; and a composite optical filter, wherein the composite optical filter comprises: a substrate; a communal optical filter formed on a first surface of the substrate; and an array of optical filters formed on a second surface of the substrate, wherein the array of optical filters includes a first set of optical filters associated with a first wavelength and a second set of optical filters associated with a second wavelength.

DETAILED DESCRIPTION

Figure 1:
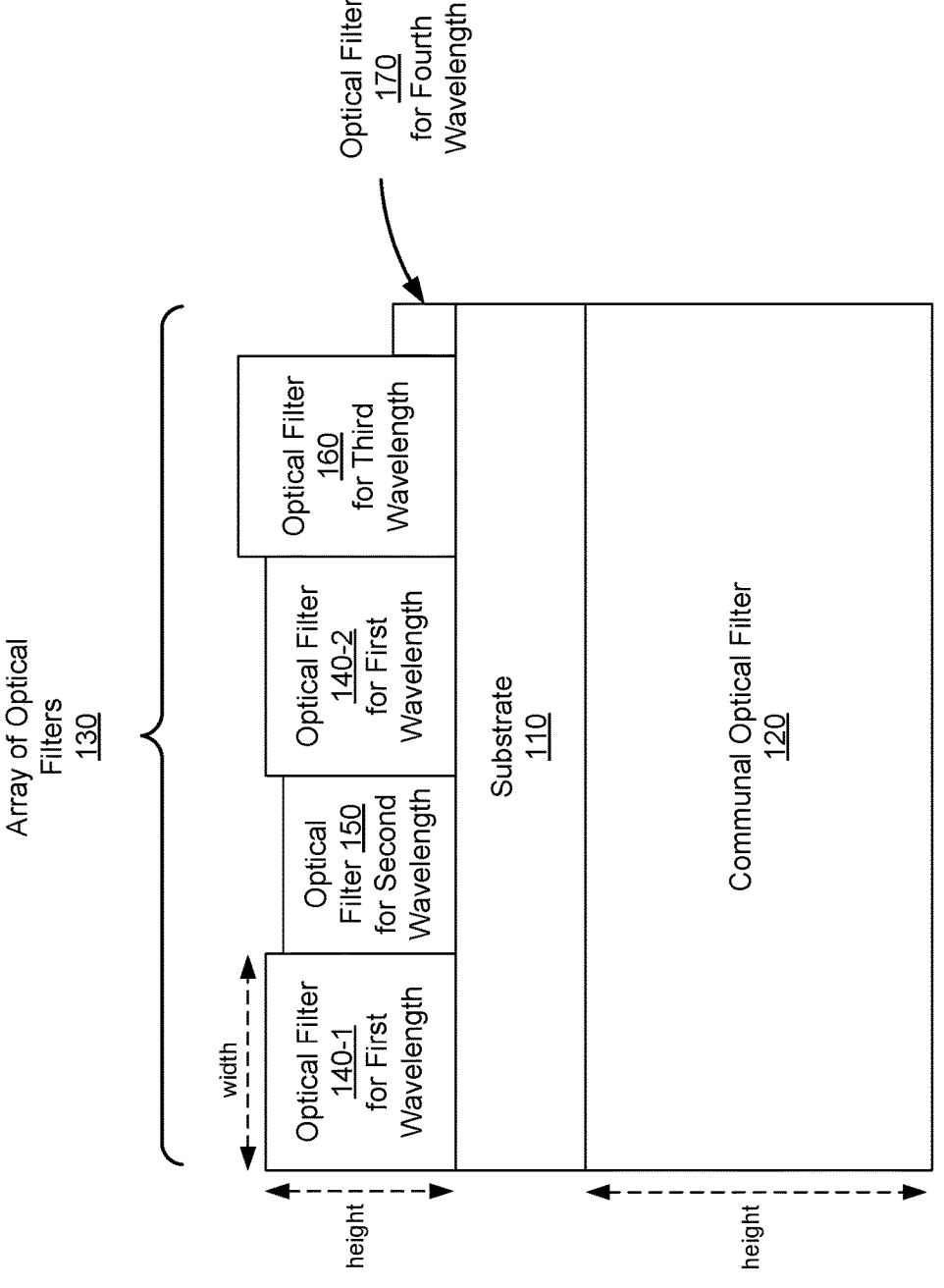
FIG. 1 is a diagram of a side view of an example composite optical filter described herein.

The following detailed description of example implementations refers to the accompanying drawings. The same reference numbers in different drawings may identify the same or similar elements.

An image sensor may be configured to generate a signal based on receiving light associated with a particular wavelength range, such as visible light (e.g., approximately 400 nm to 750 nm), infrared (IR) light, (e.g., approximately 750-1000 nm), and/or ultraviolet (UV) light (e.g., approximately 100-400 nm), among other examples. In some cases, light of a threshold intensity may be harmful for an image sensor, and certain wavelengths of light may not be filtered before reaching the sensor. For example, silicon of the image sensor may not absorb light outside of a certain range, and incident power of the undesired light may be absorbed into components of the image sensor (e.g., wire traces, dielectric structures, circuitry, and/or the like), thereby damaging or destroying the components.

In a fluorescence detection application, a beam of excitation light (e.g., from a light source) associated with a first particular wavelength range (e.g., UV light) illuminates a sample (e.g., a biological sample, such as a virus), which absorbs the excitation light and emits emission light associated with a second particular wavelength range (e.g., visible light), which is captured by an image sensor (e.g., to facilitate measurement and/or analysis of the sample). Often, a filter wheel is used to position multiple optical filters in a path between the sample and the image sensor to allow the image sensor to capture multiple images, wherein each image is related to a particular wavelength associated with an individual optical filter of the filter wheel. However, rotating the filter wheel introduces physical vibrations that may physically disturb the sample and/or cause misalignments between images, which may affect generation of a composite image of the multiple images and thereby reduce a usefulness of the composite image for measuring and/or analyzing the sample. Further, rotating the filter wheel and capturing multiple images increases a likelihood of unwanted and/or harmful light interfering with the preferred light passed by each optical filter of the filter wheel and/or damaging the image sensor.

Some implementations described herein provide a composite optical filter that includes a communal optical filter formed on a first side of a substrate and an array of optical filters formed on a second side of the substrate. The communal optical filter may block light associated with a particular wavelength range (e.g., undesired emission light) and the array of optical filters may each pass light associated with a particular wavelength (e.g., individual wavelengths associated with desired or useful emission light). Accordingly, the composite optical filter may be used with an image sensor to allow the image sensor to capture emission light associated with the same desired wavelengths associated with the individual optical filters of the filter wheel, but in a single image instead of multiple images. This eliminates the physical vibration and misalignment issues associated with rotating a filter wheel and minimizes a risk of unwanted and/or harmful light passing to the image sensor. Therefore, the composite optical filter provides a more accurate image associated with the sample, which improves measurements and/or analysis of the sample. The composite optical filter also reduces use of computer resources (e.g., processing resources, memory resources, power resources, and/or the like) that would otherwise be needed to generate a composite image of multiple images.

Further, the communal optical filter formed on the first side of the substrate of the composite optical filter allows for optical filters of the array of optical filters formed on the second side of the substrate to be thinner than they would otherwise be without use of a communal optical filter. This facilitates formation of individual optical filters (e.g., that are deposited, grown, and/or the like) on the second side of the substrate that would not otherwise be possible (e.g., because of the number of layers needed to be deposited, the height of individual optical filters needed to provide a preferred optical density, and/or the like). This also facilitates a robustness of the composite optical filter by reducing a height of individual filters of the array of optical filters and thereby reducing a likelihood of a particular optical filter bending, cracking, and/or twisting, among other examples, during the operative life of the composite optical filter.

FIG. 1 is a diagram of a side view of an example composite optical filter 100 described herein. As shown, the composite optical filter 100 may include a substrate 110. The substrate 110 may be fabricated of any suitable material that allows light associated with a particular wavelength (e.g., visible light, UV light, and/or IR light, among other examples) to pass through the substrate 110. The substrate 110 may include or may be formed using glass (e.g., a fused silica glass, and/or a borofluid glass, among other examples), a polymer (e.g., a polymer substrate, a polymer dye, and/or a polymeric matrix, among other examples), and/or the like.

As further shown in FIG. 1, the composite optical filter 100 may include a communal optical filter 120. In some implementations, the communal optical filter 120 may be disposed on a first surface of the substrate 110 (e.g., a bottom surface of the substrate 110, as shown in FIG. 1). The communal optical filter 120 may be configured to, for example, block light associated with a first particular wavelength range and/or to pass light associated with a second particular wavelength range. For example, the communal optical filter 120 may be configured to block light in the visible range and/or to pass light in the UV range.

In some implementations, the communal optical filter 120 may comprise one or more layers (e.g., one or more epitaxial layers). The one or more layers of the communal optical filter 120 may be formed (e.g., grown, deposited, and/or the like) on the first surface of the substrate 110. For example, the one or more layers may be fabricated using a sputtering procedure, a photolithographic procedure, an etching procedure, a lift off procedure, a scraping procedure, an annealing procedure, a molding procedure, a casting procedure, a machining procedure, a stamping procedure, and/or the like.

As further shown in FIG. 1, the composite optical filter 100 may include an array of optical filters 130 comprising a plurality of individual optical filters. For example, the array of optical filters 130 may include one or more optical filters 140 (shown in FIG. 1 as optical filters 140-1 and 140-2), one or more optical filters 150, one or more optical filters 160, and/or one or more optical filters 170, among other examples. Each individual optical filter may be configured to pass light associated with a respective wavelength (e.g., within a tolerance). For example, the optical filter 140-1 and the optical filter 140-2 may each be configured to pass light associated with a first wavelength, the optical filter 150 may be configured to pass light associated with a second wavelength, the optical filter 160 may be configured to pass light associated with a third wavelength, and/or the optical filter 170 may be configured to pass light associated with a fourth wavelength, among other examples. While FIG. 1 shows optical filters associated with passing light for four different wavelengths, implementations include an array of optical filters 130 that includes any number of optical filters comprising any number of individual sets of optical filters, wherein each optical filter of an individual set of optical filters is configured to pass light associated with a particular wavelength.

As further shown in FIG. 1, each optical filter of the array of optical filters 130 has a specific height and a specific width. For example, as shown, optical filter 140-1 has a height and width that is different than the respective heights and widths of optical filter 150, optical filter 160, and optical filter 170. Notably, in this example, the height and width of the optical filter 140-1 match (e.g., are equal to, within a tolerance) the height and width of the optical filter 140-2.

Optical filter 140-1 and optical filter 140-2 may have matching heights and widths because they are both associated with the first wavelength (e.g., they are each configured to pass light associated with the first wavelength and/or comprise the same composition of layers, as further described herein).

While some implementations described herein have at least some of the optical filters of the array of optical filters 130 varying in terms of height and width, at least some of the optical filters may, additionally, or alternatively, vary in respect to other dimensions and/or characteristics, such as in terms of area, circumference, diagonal length, center point location, and/or side wall angle, among other examples. Further, the optical filters of the array of optical filters 130 are shown in FIG. 1 as having a rectangular shape and touching each other (e.g., without any space between optical filters), but implementations may include any shape of optical filter (e.g., polygonal shaped, round shaped, and/or the like), with or without spaces between optical filters. As an example, optical filter 140-1 and optical filter 140-2 may have matching heights, but different shapes, different widths, different areas, and/or the like. Regardless, they may each be associated with the first wavelength (e.g., they may each be configured to pass light associated with the first wavelength and/or may each comprise the same composition of layers, as further described herein).

In some implementations, the array of optical filters 130 may be disposed on a second surface of the substrate 110 (e.g., the top surface of the substrate 110, as shown in FIG. 1). In some implementations, an optical filter of the array of optical filters 130 (e.g., optical filter 140, optical filter 150, optical filter 160, or optical filter 170) may comprise one or more layers (e.g., one or more epitaxial layers). The one or more layers of the optical filter may be formed (e.g., grown, deposited, and/or the like) on the second surface of the substrate 110. For example, the one or more layers may be fabricated using a sputtering procedure, a photolithographic procedure, an etching procedure, a lift off procedure, a scraping procedure, an annealing procedure, a molding procedure, a casting procedure, a machining procedure, a stamping procedure, and/or the like.

In some implementations, a deposition device may deposit the respective one or more layers of each optical filter of the array of optical filters 130 on the second surface of the substrate 110 to form the array of optical filters 130. For example the deposition device may deposit a set of common layers (e.g., that are to be included in the respective one or more layers of each optical filter) across the second surface of the substrate 110, and a respective set of distinct layers may be deposited at respective positions (e.g., on the set of common layers) associated with each individual optical filter on the set of common layers. In some implementations, forming the respective one or more layers of each optical filter of the array of optical filters 130 may comprise a deposition procedure (e.g., to form a layer), a photomask procedure (e.g., to remove a layer), and/or an etching procedure (e.g., to remove a layer), among other examples.

In this way, a first optical filter of the array of optical filters 130 may comprise a set of layers that is different (e.g., has a different composition, a different number of layers, a different height, and/or a different thickness of individual layers, among other examples) than a set of layers of a second optical filter of the array of optical filters 130. For example, optical filter 140-1 may comprise a set of layers that is different than the respective sets of layers of optical filter 150, optical filter 160, and/or optical filter 170. Additionally, or alternatively, when the array of optical filters 130 comprises a plurality of sets of optical filters (e.g., a set of first optical filters associated with the first wavelength, a second set of optical filters associated with the second wavelength, and so on), each optical filter of a particular set of optical filters may comprise a set of layers that matches (e.g., each has a same composition; a same number of layers; a same height, within a tolerance; a same thickness of corresponding layers, within a tolerance; among other examples) a set of layers of another optical filter of the particular set of optical filters. For example, the optical filter 140-1 may comprise a set of layers that matches a set of layers that the optical filter 140-2 comprises.

In some implementations, the array of optical filters 130 may be formed in a separate formation phase than a formation phase in which the communal optical filter 120 is formed. For example, the communal optical filter 120 may be formed on the first surface of the substrate in a first formation phase, and the array of optical filters 130 may be formed on the second surface of the substrate in a second phase.

In some implementations, the communal optical filter 120 covers an area of the first surface of the substrate 110 that corresponds to an area of the second surface of the substrate that is covered by the array of optical filters 130. For example, optical filter 140-1 may be positioned at a location on the second surface of the substrate 110 that corresponds to (e.g., is coextensive with) a location on the first surface of the substrate 110 at which a first portion of the communal optical filter 120 is positioned, optical filter 150 may be positioned at a location on the second surface of the substrate 110 that corresponds to (e.g., is coextensive with) a location on the first surface of the substrate 110 at which a second portion of the communal optical filter 120 is positioned, optical filter 160 may be positioned at a location on the second surface of the substrate 110 that corresponds to (e.g., is coextensive with) a location on the first surface of the substrate 110 at which a third portion of the communal optical filter 120 is positioned, and so on.

In some implementations, a height of the communal optical filter 120 (e.g., a thickness of the one or more layers that comprise the communal optical filter 120) is greater than a height of the array of optical filters 130 (e.g., greater than a maximum height of the array of optical filters 130). For example, as shown in FIG. 1, the height of the communal optical filter 120 is greater than the respective heights of the optical filter 140, the optical filter 150, the optical filter 160, and the optical filter 170.

As indicated above, FIG. 1 is provided as an example. Other examples may differ from what is described with regard to FIG. 1.

Figure 2:
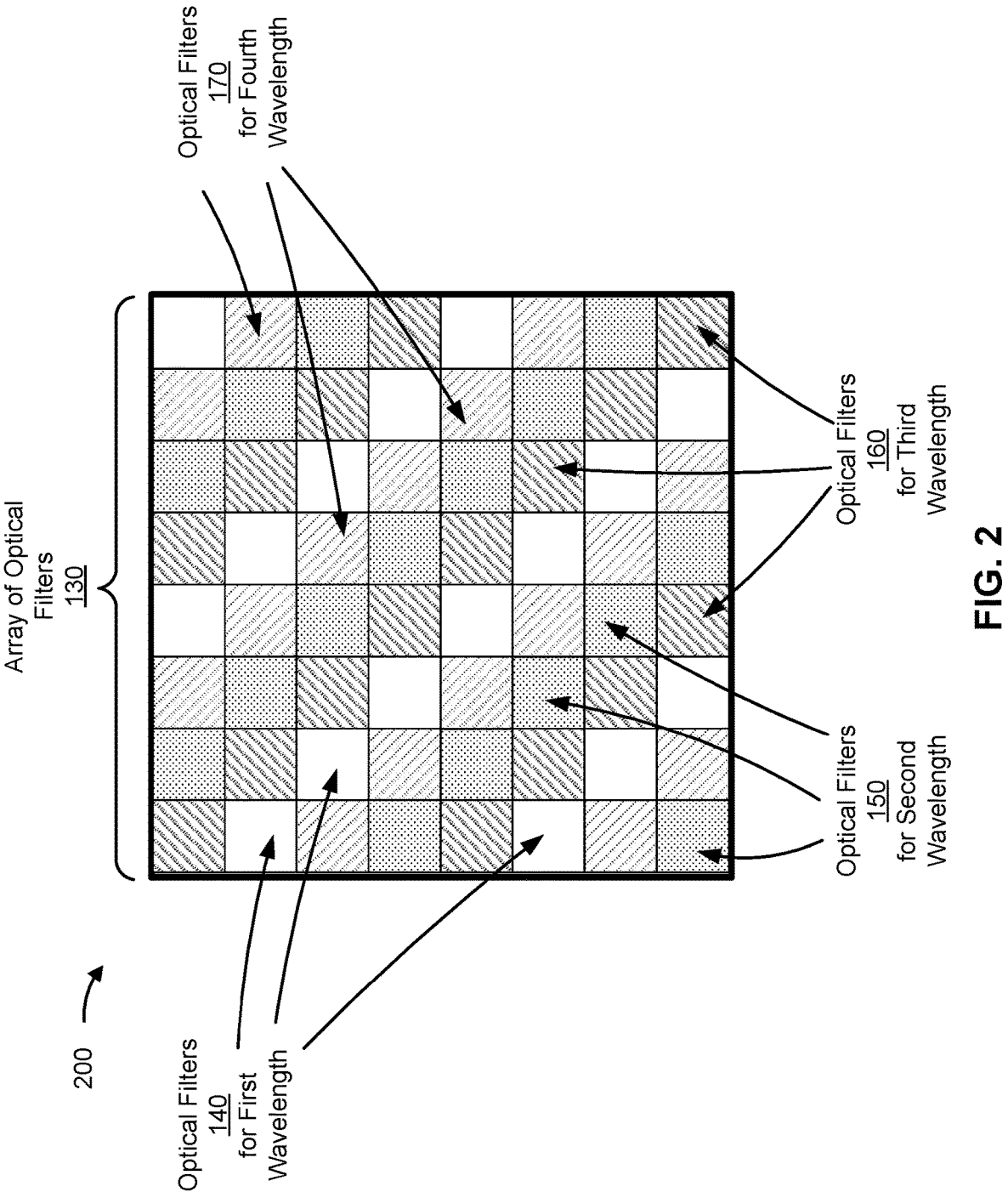
FIGS. 2-3 are diagrams of top views of example composite optical filters described herein.
Figure 3:
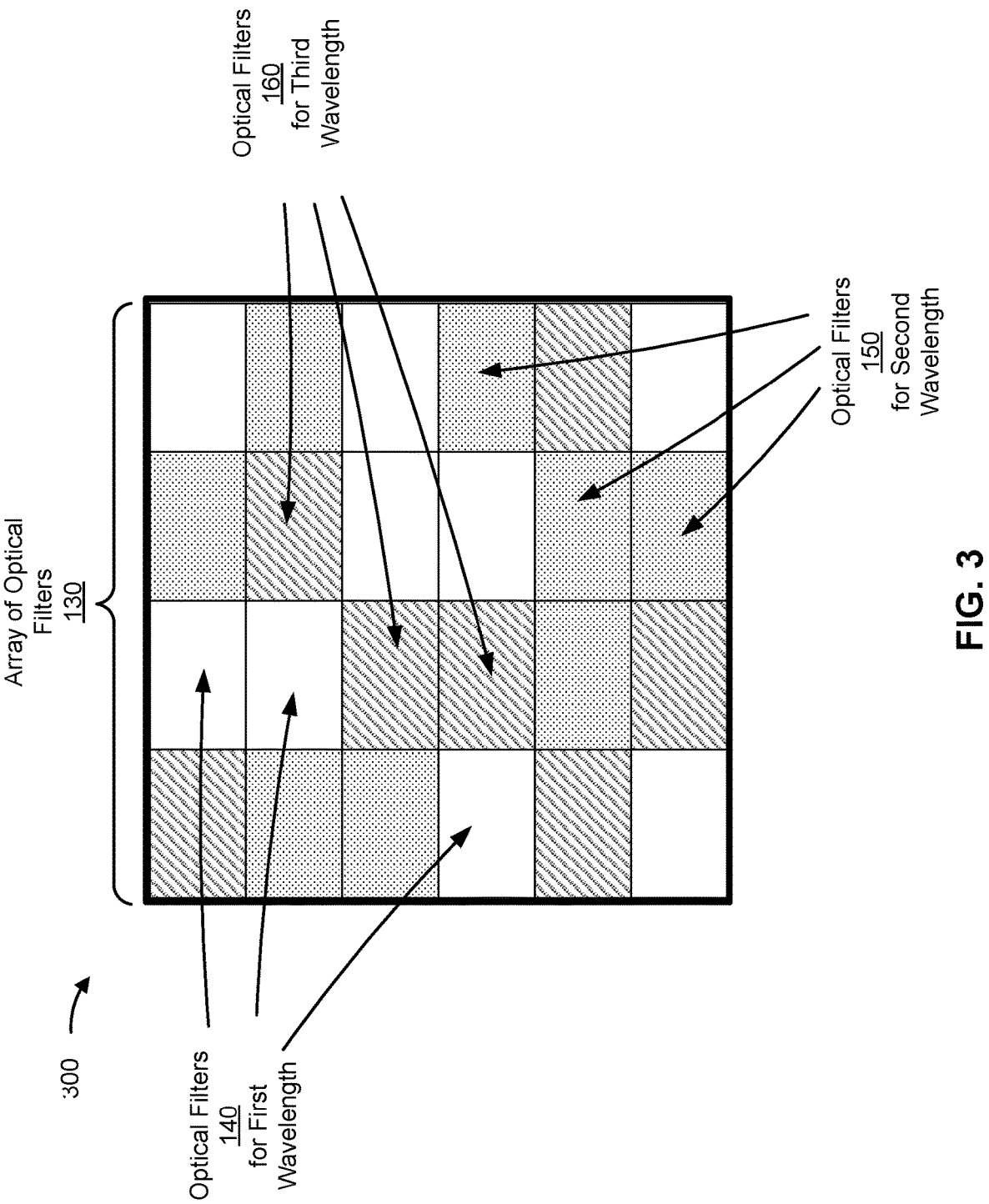

FIGS. 2-3 are diagrams of top views of example composite optical filters 200 and 300 described herein. Turning to FIG. 2, the array of optical filters 130 of composite optical filter 200 may comprise a first set of optical filters (e.g., optical filters 140, associated with the first wavelength, shown as non-shaded, non-patterned squares), a second set of optical filters (e.g., optical filters 150, associated with the second wavelength, shown as shaded squares), a third set of optical filters (e.g., optical filters 160, associated with the third wavelength, shown as squares with a left diagonal pattern), and a fourth set of optical filters (e.g., optical filters 170, associated with the fourth wavelength, shown as squares with a right diagonal pattern). As shown in FIG. 2, the first set of optical filters, the second optical filters, the third set of optical filters, and the fourth optical filter may be arranged in a uniform pattern within the array of optical filters 130 (e.g., a checkered pattern, where an optical filter of a particular set of optical filters is positioned at every fourth location along a row and column of the array of optical filters 130). While the array of optical filters 130 is shown in FIG. 2 in a uniform checkered pattern, other uniform patterns are also contemplated, such as a uniform spiral pattern, where optical filters of a particular set of optical filters are positioned at regular locations within the array of optical filters 130.

Turning to FIG. 3, the array of optical filters 130 of composite optical filter 300 may comprise a first set of optical filters (e.g., optical filters 140, associated with the first wavelength, shown as non-shaded, non-patterned rectangles), a second set of optical filters (e.g., optical filters 150, associated with the second wavelength, shown as shaded rectangles), and a third set of optical filters (e.g., optical filters 160, associated with the third wavelength, shown as rectangles with a left diagonal pattern). As shown in FIG. 3, the first set of optical filters, the second optical filters, and the third set of optical filters may be arranged in a non-uniform pattern within the array of optical filters 130 (e.g., a "random" pattern and/or a pseudorandom pattern). While the array of optical filters 130 is shown in FIG. 2 in a non-uniform checkered pattern, other non-uniform patterns are also contemplated, where optical filters of a particular set of optical filters are positioned at non-regular locations within the array of optical filters 130.

As indicated above, FIGS. 2 and 3 are provided as one or more examples. Other examples may differ from what is described with regard to FIGS. 2 and 3.

Figure 4:
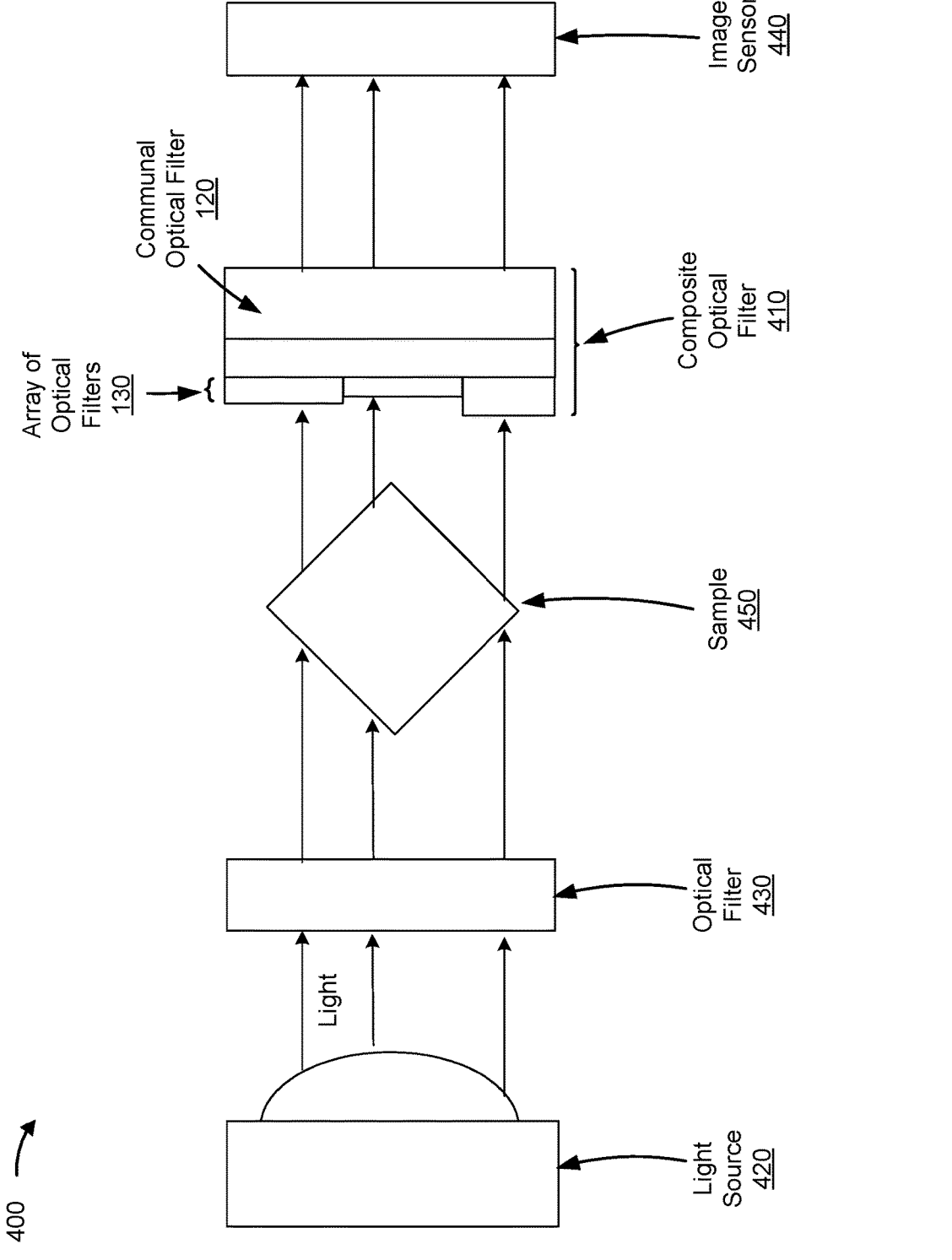
FIG. 4 is a diagram of an example optical system comprising a composite optical filter described herein.

FIG. 4 is a diagram of an example optical system 400 comprising a composite optical filter 410 (e.g., that corresponds to the composite optical filters 100, 200, and/or 300 described herein). As shown in FIG. 4, the optical system 400 may further include a light source 420, an optical filter 430, and/or an image sensor 440. The light source 420 (e.g., an incandescent lamp, such as a tungsten lamp, and/or one or more light emitting diodes, among other examples) may be configured to emit light that is used to measure and/or analyze a sample 450. The optical filter 430 may be configured to filter the light to allow a portion of the light that is associated with a particular wavelength to pass to the sample 450. The image sensor 440 may be configured to capture an image using light passed by the composite optical filter 410 (e.g., to facilitate measuring and/or analyzing the sample 450).

In one example, in an optical measurement context, the light source 420 may be configured to emit light, such as multi-spectrum light (e.g., light that includes visible light, UV light, IR light, and/or the like). The optical filter 430 may be configured to receive the light and to pass a portion of the light (e.g., IR light) to the sample 450 (e.g., to illuminate the sample 450). In some implementations, a first optical element (not shown), such as a lens, may be placed in a path of the light between the optical filter 430 and the sample 450 and may be configured to collimate the portion of the light (e.g., before the sample 450 is to receive the portion of the light) and/or to focus the portion of the light (e.g., on a particular portion of the sample 450), among other examples.

The sample 450 may reflect and/or transmit an amount of the portion of the light (hereinafter referred to as the "reflected light") to the composite optical filter 410. In some implementations, a second optical element (not shown), such as a lens, may be placed in a path of the reflected light between the sample 450 and the composite optical filter 410 and may be configured to collimate the reflected light (e.g., before the composite optical filter 410 is to receive the reflected light) and/or to focus the reflected light (e.g., on a particular portion of the composite optical filter 410), among other examples. Additionally, or alternatively, an optical diffuser (not shown) may be placed in a path of the reflected light between the sample 450 and the composite optical filter 410 (e.g., disposed over the composite optical filter 410) and may be configured to diffuse the reflected light (e.g., before the composite optical filter 410 is to receive the reflected light).

The composite optical filter 410 may be configured to receive the reflected light and to pass, to the image sensor 440, one or more portions of the reflected light that are associated with wavelengths that the array of optical filters 130 of the composite optical filter 410 are configured to pass. In some implementations, a third optical element (not shown), such as a lens, may be placed in a path of the one or more portions of the reflected light between the composite optical filter 410 and the image sensor 440 and may be configured to collimate the one or more portions of the reflected light (e.g., before the image sensor 440 is to receive the reflected light) and/or to focus the one or more portions of the reflected light (e.g., on a particular portion of the image sensor 440), among other examples. The image sensor 440 may be configured to capture an image (e.g., associated with the sample 450) using the one or more portions of the reflected light. In some implementations, the communal optical filter 120 of the composite optical filter 410 may be configured to block light associated with at least one wavelength range (e.g., that does not include the wavelengths that the array of optical filters 130 of the composite optical filter 410 are configured to pass) to prevent unwanted light from interfering with the one or more portions of the reflected light before the image sensor 440 is to receive the one or more portions of the reflected light.

In another example, in a fluorescence detection context, the light source 420 may be configured to emit excitation light, such as multi-spectrum light (e.g., light that includes visible light, UV light, IR light, and/or the like). The optical filter 430 may be configured to receive the excitation light and to pass a portion of the excitation light (e.g., UV light) to the sample 450 (e.g., to illuminate the sample 450). In some implementations, a first optical element (not shown), such as a lens, may be placed in a path of the excitation light between the optical filter 430 and the sample 450, and may be configured to collimate the portion of the excitation light (e.g., before the sample 450 is to receive the portion of the excitation light) and/or to focus the portion of the excitation light (e.g., on a particular portion of the sample 450), among other examples.

The sample 450 may absorb the portion of the excitation light and emit emission light to the composite optical filter 410. In some implementations, a second optical element (not shown), such as a lens, may be placed in a path of the emission light between the sample 450 and the composite optical filter 410, and may be configured to collimate the emission light (e.g., before the composite optical filter 410 is to receive the emission light) and/or to focus the emission light (e.g., on a particular portion of the composite optical filter 410), among other examples. Additionally, or alternatively, an optical diffuser (not shown) may be placed in a path of the emission light between the sample 450 and the composite optical filter 410 (e.g., disposed over the composite optical filter 410) and may be configured to diffuse the emission light (e.g., before the composite optical filter 410 is to receive the emission light).

The composite optical filter 410 may be configured to receive the emission light and to pass, to the image sensor 440, one or more portions of the emission light that are associated with wavelengths that the array of optical filters 130 of the composite optical filter 410 are configured to pass. In some implementations, a third optical element (not shown), such as a lens, may be placed in a path of the one or more portions of the emission light between the composite optical filter 410 and the image sensor 440, and may be configured to collimate the one or more portions of the emission light (e.g., before the image sensor 440 is to receive the emission light) and/or to focus the one or more portions of the emission light (e.g., on a particular portion of the image sensor 440), among other examples. The image sensor 440 may be configured to capture an image (e.g., associated with the sample 450) using the one or more portions of the emission light. In some implementations, the communal optical filter 120 of the composite optical filter 410 may be configured to block light associated with at least one wavelength range (e.g., that does not include the wavelengths that the array of optical filters 130 of the composite optical filter 410 are configured to pass) to prevent unwanted light from interfering with the one or more portions of the emission light before the image sensor 440 is to receive the one or more portions of the emission light.

As indicated above, FIG. 4 is provided as an example. Other examples may differ from what is described with regard to FIG. 4.

The foregoing disclosure provides illustration and description, but is not intended to be exhaustive or to limit the implementations to the precise form disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, etc., depending on the context.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or,"

unless explicitly stated otherwise (e.g., if used in combination with "either" or "only one of").

What is claimed is:

1. An optical device, comprising:
an image sensor;
a composite optical filter, comprising:
    a substrate;
    a communal optical filter formed on a first surface of the substrate;
    a plurality of first optical filters formed on one or more first portions of a second surface of the substrate,
        wherein the plurality of first optical filters are configured to pass light associated with a first wavelength, and
        wherein the plurality of first optical filters include a first filter and a second filter; and
    one or more second optical filters formed on one or more second portions of the second surface of the substrate,
        wherein the one or more second optical filters are configured to pass light associated with a second wavelength,
        wherein one or more of a first width, a first shape, or a first area of the first filter is different from one or more of a second width, a second shape, or a second area of the second filter,
        wherein the first filter comprises a first set of layers that has a different quantity of layers and a different thickness of individual layers than a second set of layers of a third filter of the one or more second optical filters,
        wherein a third height of the communal optical filter is greater than a first height of the first filter and a second height of the third filter, and
        wherein the first height of the first filter is a thickness of the first filter; and
an optical element arranged in a path of one or more portions of light between the composite optical filter and the image sensor,
    wherein the optical element is configured to:
        collimate the one or more portions of light; and
        focus the one or more portions of light on the image sensor.

2. The optical device of claim 1, wherein the communal optical filter comprises one or more communal layers,
wherein the one or more communal layers are configured to block light associated with a particular wavelength range.

3. The optical device of claim 1, wherein the communal optical filter covers an area of the first surface of the substrate that corresponds to an area of the second surface of the substrate that is covered by the plurality of first optical filters and the one or more second optical filters.

4. The optical device of claim 1, wherein the plurality of first optical filters and the one or more second optical filters are configured in a uniform pattern on the second surface of the substrate.

5. The optical device of claim 1, wherein the plurality of first optical filters and the one or more second optical filters are configured in a non-uniform pattern on the second surface of the substrate.

6. The optical device of claim 1, wherein a size of a first surface area of the first filter is different from a size of a second surface area of the second filter,
wherein the first surface area is an area that the first filter occupies on the second surface, and wherein the second surface area is an area that the second filter occupies on the second surface.

7. The optical device of claim 1, wherein a composition of the first set of layers is different than a composition of the second set of layers.

8. The optical device of claim 1, further comprising:
an optical diffuser,
    wherein the optical diffuser is disposed over the plurality of first optical filters and the one or more second optical filters.

9. An optical device comprising:
an image sensor;
a composite optical filter,
    wherein the composite optical filter comprises:
        a substrate;
        a communal optical filter formed on a first surface of the substrate; and
        an array of optical filters formed on a second surface of the substrate,
            wherein the array of optical filters includes:
                a first optical filter configured to pass light associated with a first wavelength,
                a second optical filter configured to pass light associated with a second wavelength,
                a third optical filter, and
                a fourth optical filter,
            wherein a first height of the first optical filter is different from a second height of the second optical filter, a third height of the third optical filter, and a fourth height of the fourth optical filter, and
            wherein the first height of the first optical filter corresponds to a thickness of the first optical filter; and
an optical element arranged in a path of one or more portions of light between the composite optical filter and the image sensor,
    wherein the optical element is configured to:
        collimate the one or more portions of light; and
        focus the one or more portions of light on the image sensor.

10. The optical device of claim 9, wherein the image sensor is configured to capture an image using the one or more portions of light passed by the composite optical filter.

11. The optical device of claim 9, further comprising:
an optical diffuser configured to diffuse light, wherein the composite optical filter is configured to filter light diffused by the optical diffuser.

12. The optical device of claim 9, wherein the first optical filter is positioned at a first location on the second surface of the substrate that corresponds to a first location on the first surface of the substrate at which a first portion of the communal optical filter is positioned, and
wherein the second optical filter is positioned at a second location on the second surface of the substrate that corresponds to a second location on the first surface of the substrate at which a second portion of the communal optical filter is positioned.

13. The optical device of claim 9, wherein the first optical filter, the second optical filter, the third optical filter, and the fourth optical filter are arranged in a non-uniform pattern within the array of optical filters.

14. The optical device of claim 9, wherein the optical element is a first optical element, and wherein the optical device further comprises:

a second optical element configured to collimate light, wherein the composite optical filter is configured to receive light collimated by the second optical element.

15. The optical device of claim 9, wherein the first optical filter comprises a first set of layers, wherein the second optical filter comprises a second set of layers, and wherein a number of layers of the first set of layers is different than a number of layers of the second set of layers.

16. An optical system comprising:

a light source;

an image sensor;

a composite optical filter, wherein the composite optical filter comprises:

a substrate;

a communal optical filter formed on a first surface of the substrate; and an array of optical filters formed on a second surface of the substrate, wherein the array of optical filters includes a first set of optical filters associated with a first wavelength and a second set of optical filters associated with a second wavelength, wherein the first set of optical filters includes a first optical filter and a second optical filter, wherein the second set of optical filters includes a third optical filter, wherein a first height of the first optical filter matches a second height of the second optical filter and is different from a third height of the third optical filter, and wherein the first height of the first optical filter is a thickness of the first optical filter; and an optical element arranged in a path of one or more portions of light between the composite optical filter and the image sensor, wherein the optical element is configured to:

collimate the one or more portions of the light; and focus the one or more portions of the light on the image sensor.

17. The optical system of claim 16, further comprising:

a different optical filter that is positioned between the light source and the composite optical filter, wherein:

the light source is configured to emit excitation light;

the different optical filter is configured to:

receive the excitation light emitted by the light source, and pass a portion of the excitation light that is associated with a particular wavelength range to a sample to illuminate the sample; and the composite optical filter is configured to:

receive emission light emitted by the sample when the sample is illuminated by the portion of the excitation light, and pass a portion of the emission light that is associated with the first wavelength and the second wavelength to the image sensor.

18. The optical system of claim 16, wherein the communal optical filter is configured to block light associated with at least one particular wavelength range that does not include the first wavelength and the second wavelength.

19. The optical system of claim 16, wherein the first set of optical filters and the second set of optical filters are arranged in a uniform pattern within the array of optical filters.

20. The optical system of claim 16, wherein:

the communal optical filter comprises a first set of layers;

the first optical filter comprises a second set of layers;

the second optical filter comprises a third set of layers;

the thickness of the first optical filter is a thickness of the second set of layers;

the second height of the first optical filter is a thickness of the third set of layers; and a thickness of the first set of layers is greater than the thickness of the second set of layers and greater than the thickness of the third set of layers.

* * * * *